United States Patent
Glorioso et al.

(10) Patent No.: US 11,412,766 B2
(45) Date of Patent: Aug. 16, 2022

(54) HUMIDITY CONTROL SYSTEM

(71) Applicant: Desiccare, Inc., Las Vegas, NV (US)

(72) Inventors: Sammie Joe Glorioso, Ridgeland, MS (US); Benjamin Edward Blankenhorn, Las Vegas, NV (US)

(73) Assignee: DESICCARE, INC., Las Vegas, NV (US)

( * ) Notice: Subject to any disclaimer, the term of this patent is extended or adjusted under 35 U.S.C. 154(b) by 0 days.

(21) Appl. No.: 16/447,046

(22) Filed: Jun. 20, 2019

(65) Prior Publication Data

US 2019/0387779 A1    Dec. 26, 2019

Related U.S. Application Data

(60) Provisional application No. 62/689,009, filed on Jun. 22, 2018.

(51) Int. Cl.
*B65D 81/26* (2006.01)
*A23L 27/00* (2016.01)
*A23L 27/10* (2016.01)
*A23L 3/3427* (2006.01)

(52) U.S. Cl.
CPC ............ *A23L 27/70* (2016.08); *A23L 3/3427* (2013.01); *A23L 27/10* (2016.08); *B65D 81/268* (2013.01); *A23V 2002/00* (2013.01)

(58) Field of Classification Search
CPC ........ A23L 27/70; A23L 27/10; A23L 3/3427; B65D 81/268; B65D 81/266; B65D 81/264; A23V 2200/23
USPC ........................................................ 206/204
See application file for complete search history.

(56) References Cited

U.S. PATENT DOCUMENTS

| | | | |
|---|---|---|---|
| 5,510,166 A | 4/1996 | Inoue et al. | |
| 6,250,495 B1 | 6/2001 | Bando | |
| 7,615,269 B2 | 11/2009 | Payne et al. | |
| 8,048,201 B2 | 11/2011 | Dukes et al. | |
| 9,616,382 B2 * | 4/2017 | Glorioso | B01D 53/0407 |
| 2003/0228402 A1 | 12/2003 | Franklin et al. | |
| 2005/0255202 A1 | 11/2005 | Dalziel et al. | |

(Continued)

FOREIGN PATENT DOCUMENTS

| | | |
|---|---|---|
| CL | 200702758 | 9/2006 |
| CL | 2011002539 | 10/2011 |

(Continued)

OTHER PUBLICATIONS

Limonene wikipedia article, accessed May 19, 2021, https://en.wikipedia.org/wiki/Limonene.*

(Continued)

*Primary Examiner* — Rafael A Ortiz
(74) *Attorney, Agent, or Firm* — Lewis Roca Rothgerber Christie LLP

(57) ABSTRACT

A humidity control system includes a two-way humidity control material, a plant extract, and a package housing the two-way humidity control material and the plant extract. A method of flavoring a product and controlling the humidity of an environment in a container includes inserting a humidity control system in the container and enclosing the product in the container. The humidity control system includes a two-way humidity control material, a plant extract, and a package housing the two-way humidity control material and the plant extract.

14 Claims, 3 Drawing Sheets

(56) References Cited

U.S. PATENT DOCUMENTS

| | | | | |
|---|---|---|---|---|
| 2006/0144726 A1* | 7/2006 | Foust | ............... | B65D 43/162 |
| | | | | 206/204 |
| 2013/0220353 A1* | 8/2013 | Kobayashi | ............ | A23L 27/75 |
| | | | | 131/335 |
| 2017/0043293 A1 | 2/2017 | Glorioso et al. | | |
| 2017/0348246 A1* | 12/2017 | Tohara | ............... | A61K 47/34 |

FOREIGN PATENT DOCUMENTS

| | | |
|---|---|---|
| CN | 1207335 C | 6/2005 |
| CN | 104842607 A | 8/2015 |
| DE | 102007028467 A1 | 12/2008 |
| EP | 0835685 A1 | 9/2002 |
| EP | 3012009 A | 4/2016 |
| GB | 2161093 B | 1/1986 |
| KR | 20050013986 A | 2/2005 |
| TW | M304449 U | 1/2007 |
| TW | 201507942 A | 3/2015 |
| WO | 0179341 C | 6/2005 |
| WO | 2006103640 A | 10/2006 |
| WO | 2008-037699 A1 | 4/2008 |
| WO | 2010-120705 A1 | 10/2010 |

OTHER PUBLICATIONS

"Adding Your Own Flavors to Cigars (Alternate Way)" (mikescigars.com), Jan. 28, 2017, [online] <URL: https://web.archive.org/web/20170128161540/https://www.mikescigars.com/blog/adding-your-own-flavors-to-cigars/ 2/> p. 1.

International Search Report and Written Opinion for PCT Application No. PCT/US2019/038194, dated Sep. 13, 2019, 9 pages.

Taiwan Search Report for Application No. 108121762, dated Feb. 6, 2020, 1 page.

International Preliminary Report On Patentability and Written Opinion for PCT Application No. PCT/US2019/038194, dated Dec. 30, 2020, 8 pages.

* cited by examiner

HUMIDITY CONTROL SYSTEM

CROSS-REFERENCE TO RELATED APPLICATION

The present application claims priority to and the benefit of U.S. Provisional Patent Application Ser. No. 62/689,009, filed Jun. 22, 2018, the entire content of which is incorporated herein by reference.

BACKGROUND

1. Field

The present disclosure relates generally to the field of humidity control. The present disclosure also relates generally to the field of modifying sensory perception in an environment, such as taste or smell.

2. Description of the Related Art

Humidity control products in general are well known. A desiccant is a hygroscopic substance that adsorbs moisture in an environment to modify (and maintain) a relative humidity in a particular environment. A humectant is a hygroscopic substance that absorbs moisture in an environment, which is also used to modify (and maintain) moisture in that environment. There are also two-way humidity control products (also called two-way humectants), such as glycerin water solutions and saturated salt solutions, which both absorb and adsorb moisture, allowing for the ambient relative humidity to be increased or decreased to a desired relative humidity.

Humidity control products may be used in various applications, such as preservation of food, herbs, pharmaceuticals and tobacco, for example. As such, it is often desirable to control humidity and other environmental factors concurrently. For example, it may be desirable to control both humidity and the scent of the surrounding environment, or to control both humidity and oxygen in the surrounding environment. In addition, certain flavored products may lose their efficacy over time, so it may be desirable to control humidity and supply or re-supply flavor to products in the surrounding environment.

Various plant extracts, such as terpenes and essential oils, are known to provide fragrance and/or flavor to products, such as food products or tobacco. However, such flavoring requires direct exposure to the product, for example by adding droplets of plant extracts directly to the product to be flavored or by vaporization of the plant extract.

SUMMARY

A humidity control system according to one or more embodiments of the present disclosure is directed to a humidity controller, such as a humectant or a two-way humectant, with plant extracts, such as essential oils or terpenes, incorporated inside of a package that provides humidity control and provides flavor and/or scent to the surrounding environment and/or products in the surrounding environment. In one or more embodiments of the present disclosure, the humidity control system includes a two-way humidity controlling substance mixed with terpenes and housed in a package having a coating thereon. The package may include a porous material. In some embodiments, the coating is polyethylene. In some embodiments, the plant extract may be a terpene such as Linalool, Myrcene, and/or a-Pinene.

BRIEF DESCRIPTION OF THE DRAWINGS

These and other features and aspects of embodiments of the present disclosure will be better understood by reference to the following detailed description, when considered in conjunction with the accompanying drawings. The same numbers are used throughout the figures to reference like features and components. The figures are schematic in nature and may not be drawn to scale.

DETAILED DESCRIPTION

Figure 1:
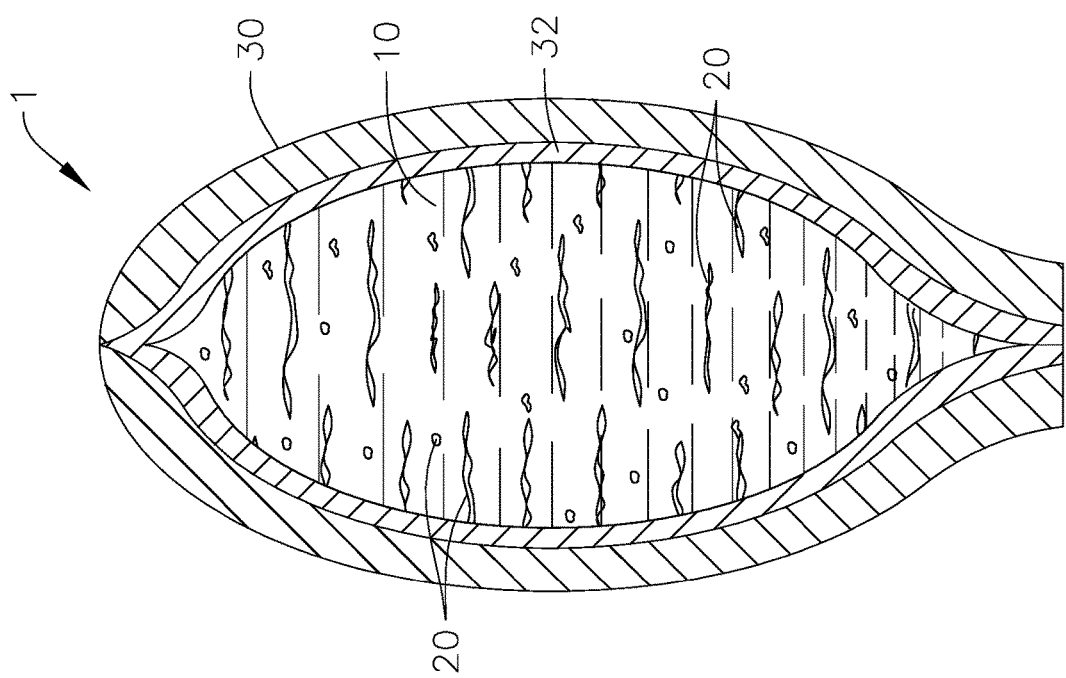
FIG. 1 illustrates a humidity control system according to one or more embodiments of the present disclosure.
Figure 2:
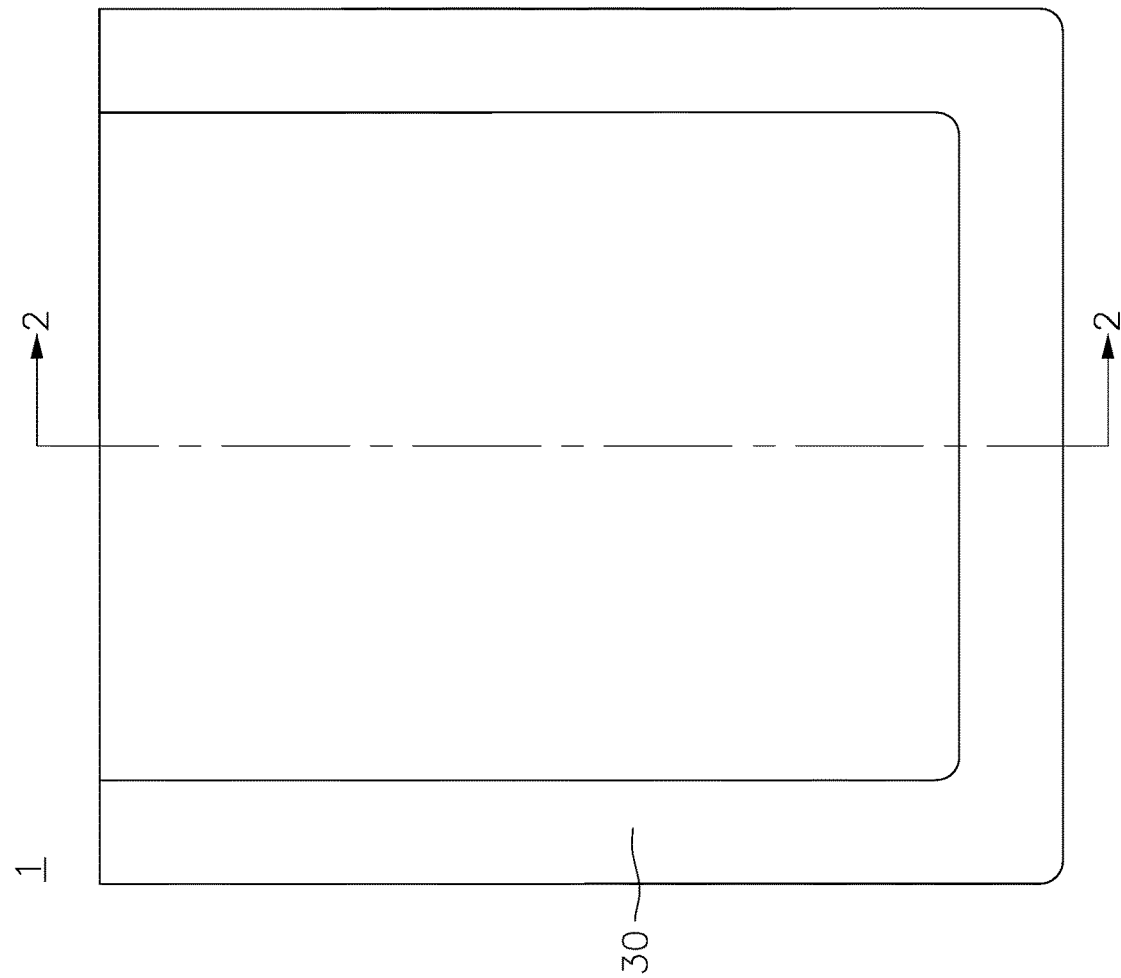
FIG. 2 illustrates a cross-sectional view of the humidity control system of FIG. 1 taken along the line I-I of FIG. 1.

Referring to FIGS. 1 and 2, a humidity control system 1 includes a humidity control substance 10 and a plant extract (e.g., an unsaturated hydrocarbon found in plants and their essential oils) 20 in a package 30. The package 30 is made of a porous material which is permeable to vapor, and will pass vapor, but is impervious to liquid, dust and other particulates. For example, in one or more embodiments, kraft paper having a basis weight of 30 lbs/msi (pounds per 1,000 square inches) or more is used for the package 30. As another example, the package may be an elastomeric polyester.

The package 30 may include a coating 32 (e.g., a microporous coating) between the package 30 and the humidity control substance 10 and the plant extract 20. The coating 32 is selected such that it provides adequate moisture vapor transmission (MVT) and seals the package 30. Thus, the coating 32 may also be used as an adhesive to join together opposing sides of the package 30 according to embodiments. The coating 32 also reduces or minimizes the likelihood of leakage of the humidity control substance 10 and the plant extract 20 through the package 30. The coating 32 may be polyethylene, oriented polystyrene, a porous polyethylene resin, polyurethane, a polyether block amide, and/or a polymeric mixture including a hydrophilic monomer. The coating 32 prevents or reduces the likelihood of the humidity control substance 10 and the plant extract 20 leaking from the package 30.

The coating 32 may be compliant with the Food and Drug Administration (FDA) standards, e.g., the regulations as stated in the Code of Federal Regulations, Title 21. For example, the coating 32 may omit any raw materials that are not included in the applicable sections of Title 21 of the Code of Federal Regulations. The thickness of the coating may range from between about 0.0005 inch and 0.01 inch, preferably between about 0.0005 inch and 0.002 inch, and more preferably 0.001 inch. As shown in Table 1, at varying thicknesses of the coating 32, the water vapor transmission rate (WVTR) of the humectant system may vary from about 16 g/100 sq. in/day to about 42 g/100 sq. in/day. It will be appreciated that a smaller thickness of the coating 32 reduces costs of materials and provides for faster MVT/

WVTR, but that when the coating 32 has a thickness that is too small, the humidity control system 1 may experience leaks and the coating 32 may not exhibit sufficient adhesive qualities.

TABLE 1

| Thickness (inches) | FDA Compliant? | WVTR (g/100 sq. in/day) |
|---|---|---|
| 0.001 | Yes | 28 |
| 0.002 | Yes | 16 |
| 0.001 | No | 42 |
| 0.002 | No | 18 |

In some embodiments, a thicker coating may be desired. For example, in some embodiments, the coating 32 may be provided at a thickness of about 0.01 inch to provide for slower MVT for longer-term uses. As an example, in some embodiments, a thicker coating 32 may be used along with the plant extract 20, such as citronella oil, which is effective in repelling mosquitoes, and provides for longer protection from mosquitos, e.g., for use on a lengthy backpacking or fishing trip.

Figure 3:
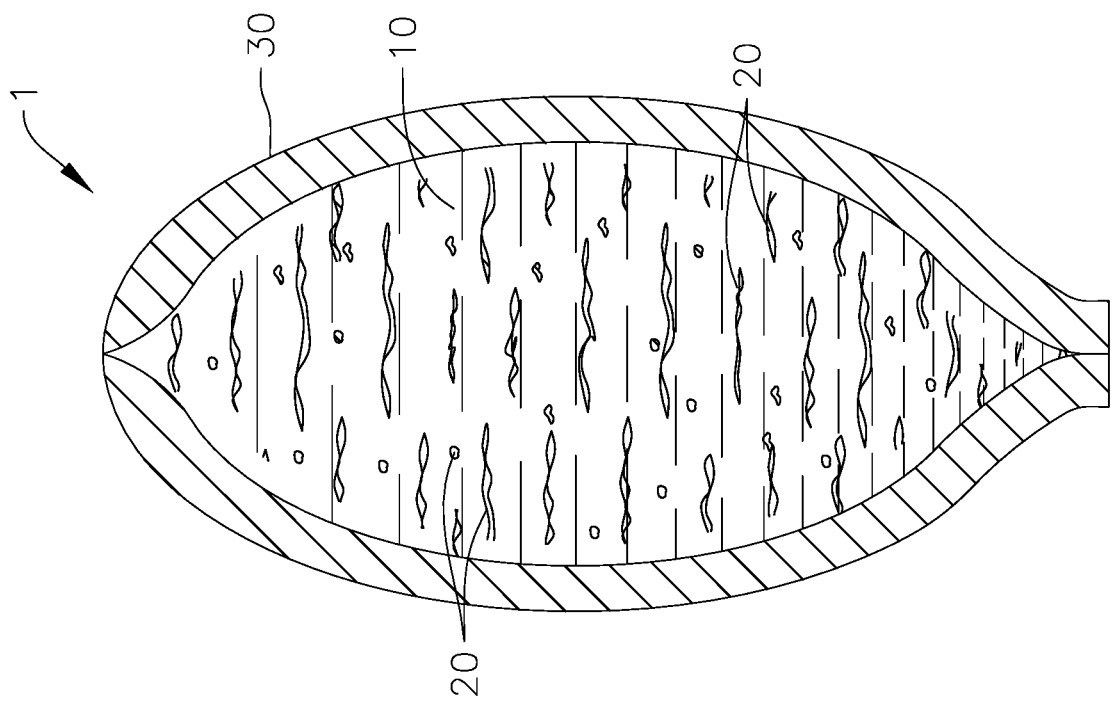
FIG. 3 illustrates a cross-sectional view of the humidity control system of FIG. 1 taken along the line 1-1 of FIG. 1 according to another embodiment of the present disclosure.

In some embodiments, the package 30 may be selected such that the coating 32 is not needed. For example, referring to FIG. 3, in some embodiments, the package 30 may include a nonwoven fabric including polyethylene and/or polypropylene. As such, the package 30 may adhere to itself, and provide for a faster WVTR because no additional coating is needed. In embodiments including the package 30 without the coating 32, the package 30 is sealed at a pressure (e.g., a predetermined pressure) that allows facing portions of the package 30 to seal to each other.

In some embodiments, the package 30 may include a nonwoven fabric including polyethylene and a polypropylene spunbound (PPSB) material. For example, a suitable nonwoven fabric is the MACTEX® 203020 material (MACTEX® is a registered trademark of Mactex, Incorporated). In some embodiments, a material with 20 grams per square meter (GSM) polyethylene+30 GMS PPSB+20 GSM polyethylene may be utilized.

The humidity control substance 10 may include a desiccant, an oxygen scavenger, an ethylene absorber, a one-way humectant, and/or a two-way humidity control product.

In some embodiments, the humidity control substance 10 may include a two way humidity control product, such as a saturated salt solution or a viscous miscible glycerol (or glycerin) and water mix. Humidity control systems including a viscous miscible glycerol and water mix to provide two way humidity control are described in U.S. Pat. Nos. 9,616,381 and 9,616,382 to Desiccare, Inc., which incorporated herein by reference in their entirety.

According to embodiments of the disclosure, the humidity control system 1 includes the plant extract 20. In some embodiments, the plant extract 20 may include a terpene, an essential oil, etc.

In some embodiments, the plant extract 20 may include at least one of the terpenes Linalool, Myrcene, a-Pinene, Humulene, Beta-Caryophyllene, and combinations thereof. The plant extract 20 may be blended with the humidity control substance such that the plant extract 20 is between about 0.025% and about 5.0% by weight. In some embodiments, the plant extract 20 may be blended with the humidity control substance such that the plant extract 20 is about 4% by weight.

In some embodiments, the plant extract 20 may be blended with glycerin at about 95 degrees F. to about 100 degrees F. The plant extract 20 may be at room temperature before blending. After blending the glycerin and plant extract, additional components, such as water, are blended to the glycerin-plant extract mixture. The combined glycerin-plant extract mixture is then contained by the package 30 having the coating 32.

In some embodiments, the glycerin and water may be mixed together to form the humidity control substance 10, and then the plant extract 20 is combined with the humidity control substance 10. According to embodiments, the plant extract 20 is combined with the humidity control substance 10 before it gels.

In some embodiments, the plant extract 20 may be provided in relative quantities such that the plant extract transmits a scent through the package and/or flavors products in the surrounding environment, e.g., tobacco or herbs in the surrounding environment. As such, the humidity control system 1 may provide flavoring and/or scent to unflavored products in the surrounding environment, such as tobacco, or may resupply flavor and/or scent to flavored products in the surrounding environment that have reduced efficacy, e.g., are no longer as flavorful as they once were.

In some embodiments, the humidity control system 1 may include plant extract (e.g., terpenes) in sufficient quantities to prevent or inhibit mold growth in the surrounding environment. For example, the humidity control system 1 may include limonene and/or citronella, which have both been found to inhibit mold growth.

In some embodiments, the humidity control system 1 may include a combination of plant extracts (e.g., terpenes) that provide scents and/or flavors and mold inhibiting features.

In one or more embodiments, the humidity control substance 10 may include a saturated salt solution and glycerin. In some embodiments, the humidity control substance 10 may include a salt solution and an emulsifier or a surfactant. In some embodiments, a salt is added as a 325 mesh powder to a mix of cellulose powder, such as SOLKA-FLOC® 40 grade (SOLKA-FLOC® is a registered trademark of Solvaira Specialty, L.P.). In some embodiments, ascorbic acid powder may also be included to provide for oxygen removal. A solution of glycerin and/or distilled water may be added, which allows for placement in various suitable packages and/or packages with film coated thereon. For example, the solution of glycerin and/or distilled water may be metered into the salt solution using a SANKO® FC-80 packaging machine (SANKO® is a registered trademark of Sanko Machinery Co., Ltd.).

In some embodiments, the humidity control substance 10 also includes a gelling agent. The gelling agent may be a food hydrocolloid. For example, the gelling agent may be any one of gelatin, xanthan, alginate, and/or pectin. The gelling agent may increase viscosity of the humidity control substance 10 and/or the glycerin-plant extract mixture and may reduce or minimize the likelihood of the humidity control substance 10 and/or the glycerin-plant extract mixture leaching through the coating 32 and the package 30.

It will be appreciated that although reference is made herein to a plant extract 20, that the plant extract may be material that is extracted from a plant, or may be synthetic or man-made such that is has the same or substantially the same properties as various plant extracts.

Figure 4:
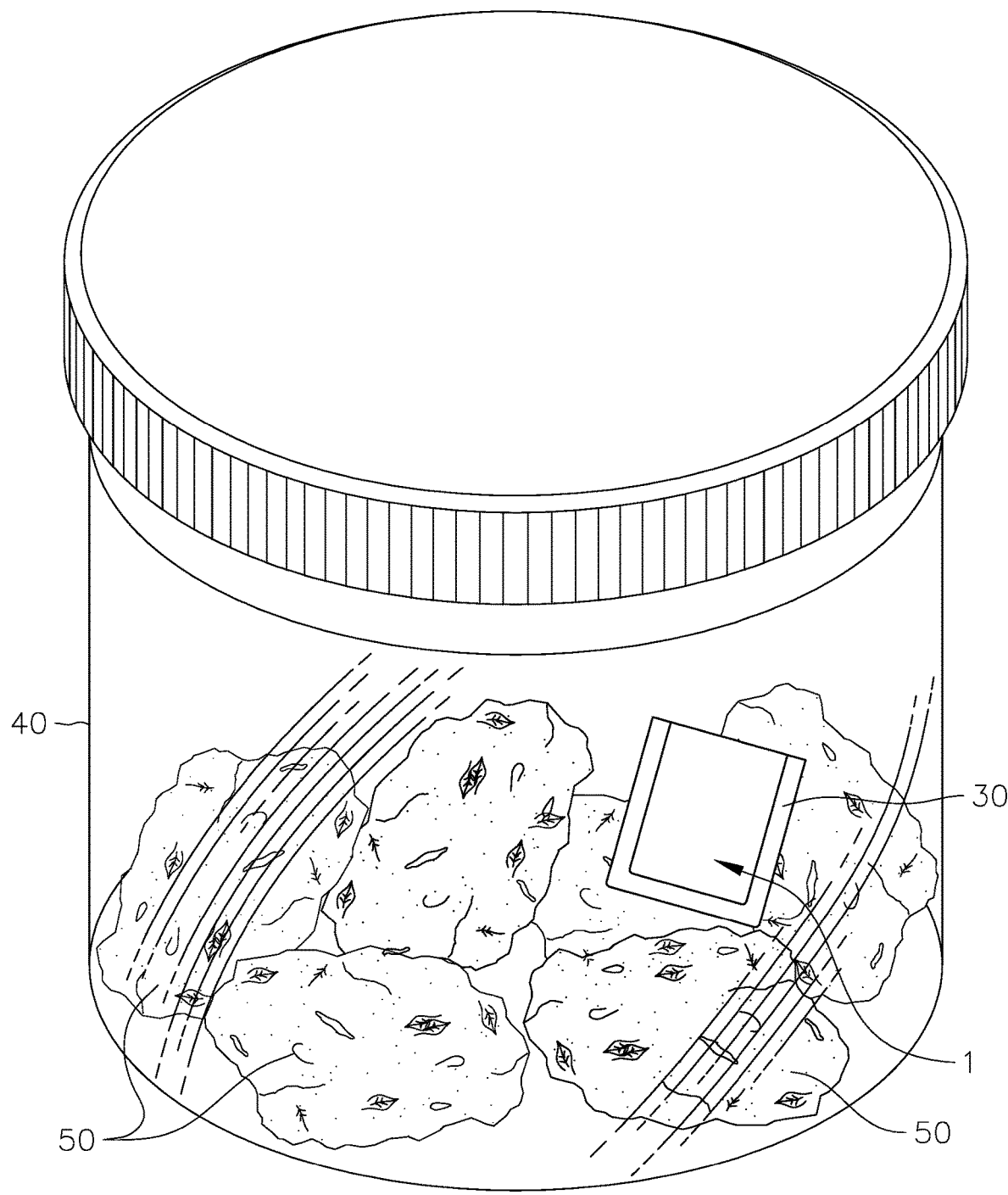
FIG. 4 illustrates a humidity control system in a closed environment according to one or more embodiments of the present disclosure.

According to embodiments of the invention, referring to FIG. 4, the humidity control system 1 may be placed in a container 40 along with a product 50. The container 40 may be, for an example, an air-tight container, a humidor, etc. The product 50 may be, for example, tobacco, herbs, dried food products, etc. The humidity control system 1 and the product 50 may both be inserted into the container 40, and the container 40 may be then be closed. The humidity control system 1 having the humidity control substance 10 and the plant extract 20 then controls the relative humidity inside of the container 40, and provides the plant extract 20 (e.g., an essence of the plant extract 20) to the environment inside of the container 40, which may then flavor the product 50, provide fragrance to the surrounding environment or product 50, and/or inhibit mold growth inside the container 40, etc.

In some embodiments, a humidity indicating card may be affixed to the humidity control system 1, such as the humidity indicating card disclosed in U.S. Pat. No. 9,618,456, to Desiccare, Inc., which is incorporated herein by reference in its entirety.

While this disclosure has been described in detail with particular references to some exemplary embodiments thereof, the exemplary embodiments described herein are not intended to be exhaustive or to limit the scope of the disclosure to the exact forms disclosed. It is understood that the drawings are not necessarily to scale. Persons skilled in the art and technology to which this disclosure pertains will appreciate that alterations and changes in the described structures and methods of assembly and operation can be practiced without meaningfully departing from the principles, spirit, and scope of this disclosure, as set forth in the following claims and their equivalents.

What is claimed is:

1. A humidity control system comprising:
   a two-way humidity control material;
   a terpene blended with the humidity control material to form a mixture, the terpene present in a quantity that provides fragrance and flavor to a product stored with the mixture; and
   a package housing the two-way humidity control material and the terpene mixture,
   wherein the quantity of the terpene is between about 0.025% and about 5.0% by weight of the mixture,
   wherein the terpene is blended with glycerin at about 95 degrees Fahrenheit to about 100 degrees Fahrenheit before the glycerin gels.

2. The humidity control system of claim 1, wherein the package comprises a nonwoven fabric.

3. The humidity control system of claim 2, wherein the nonwoven fabric comprises polyethylene and/or polypropylene.

4. The humidity control system of claim 3, wherein the nonwoven fabric comprises polyethylene and a polypropylene spunbound material.

5. The humidity control system of claim 1, further comprising a coating on an inner surface of the package.

6. The humidity control system of claim 5, wherein the coating comprises polyethylene, oriented polystyrene, a porous polyethylene resin, polyurethane, a polyether block amide, and/or a polymeric mixture including a hydrophilic monomer.

7. The humidity control system of claim 1, wherein the humidity control material comprises a viscous miscible glycerol and water mix.

8. The humidity control system of claim 1, wherein the humidity control material comprises a saturated salt solution.

9. The humidity control system of claim 1, wherein the terpene comprises one or more of Linalool, Myrcene, a-Pinene, Humulene, and Beta-Caryophyllene.

10. The humidity control system of claim 1, further comprising ascorbic acid, the ascorbic acid being housed in the package with the humidity control material and the terpene.

11. The humidity control system of claim 1, further comprising a humidity indicating card affixed to the package.

12. The humidity control system of claim 1, wherein the terpene is 4% by weight of the mixture.

13. A method of flavoring a product and controlling humidity of an environment in a container, the method comprising:
   inserting a humidity control system in the container, the humidity control system comprising:
      a two-way humidity control material;
      a terpene blended with the humidity control material to form a mixture, the terpene present in a quantity that provides fragrance and flavor to a product stored with the mixture; and
      a package housing the two-way humidity control material and the terpene mixture; and
   enclosing the product in the container,
   wherein the quantity of the terpene is between about 0.025% and about 5.0% by weight of the mixture,
   wherein the terpene is blended with glycerin at about 95 degrees Fahrenheit to about 100 degrees Fahrenheit before the glycerein gels.

14. The method of claim 13, wherein the terpene comprises one or more of Linalool, Myrcene, a-Pinene, Humulene, and Beta-Caryophyllene.

* * * * *